United States Patent [19]

Mazeski et al.

[11] 4,078,319
[45] Mar. 14, 1978

[54] APPARATUS AND METHOD FOR TEACHING READING

[76] Inventors: Conrad A. Mazeski; Ken Candelaria, both of 201 W. Prospect Ave., Mount Prospect, Ill. 60056

[21] Appl. No.: 745,170

[22] Filed: Nov. 26, 1976

Related U.S. Application Data

[63] Continuation-in-part of Ser. No. 666,486, Mar. 12, 1976, abandoned.

[51] Int. Cl.² .............................................. G09B 17/00
[52] U.S. Cl. .................................................... 35/35 R
[58] Field of Search ............... 35/35 R, 35 B; 40/341, 40/352, 353; 350/115, 116, 241

[56] References Cited

U.S. PATENT DOCUMENTS

| 2,110,344 | 3/1938  | Taylor et al. ...................... 35/35 B X |
| 2,183,095 | 12/1939 | Fleming ............................ 35/35 R X |
| 2,604,009 | 7/1952  | Walrath ................................. 350/241 |
| 2,724,305 | 11/1955 | Brandt ............................. 35/35 B X |
| 2,758,393 | 8/1956  | Levy ..................................... 35/35 B |
| 3,038,120 | 6/1962  | Bernstein et al. ............... 35/35 R X |
| 3,126,647 | 3/1964  | Hazelett ............................... 35/35 R |
| 3,421,233 | 1/1969  | Gaal ..................................... 35/35 R |
| 3,570,145 | 3/1971  | Hickey ................................. 35/35 R |

OTHER PUBLICATIONS

Knott Apparatus Co. Catalog, No. 21, received Jan. 10, 1917, pp. 258–259.

*Primary Examiner*—William H. Grieb
*Attorney, Agent, or Firm*—James T. FitzGibbon

[57] ABSTRACT

An apparatus and method for teaching reading which is based on training the eye of a reader to fix or focus initially on a word or letter group lying within an area defined by an intentionally reduced or narrow angular lateral span, and subsequently to be exposed to groups of letters, words, and groups of words of gradually increasing lateral span. The student also systematizes the direction of a succession of eye movements and uses exterior rhythmic stimuli to reinforce the rhythm of eye movement.

Preferably, the student is furnished with reading material which consists of a series of word groups of normal print size, arranged in logical sequence and of simple content. The words are observed by the student through an optical lens which greatly reduces the image size of the printed matter, causing each word to lie within a very small angular lateral span. The student then rhythmically moves his line of sight from the first or left-hand word in such group to the next horizontal word, etc. until the end of the group is reached, whereupon his eyes return to the left margin and continue a series of left-to-right movements. As the student masters the rhythm of reading, and is able to grasp the words, an image-reducing lens of less optical power is substituted, and the training continues with lenses of gradually decreasing power. Finally the student is able to repeat the eye movements and understand material of increased lateral span, thereby improving his reading rate without sacrificing comprehension.

An apparatus comprising a reading material holder and viewing lens support means is also described.

20 Claims, 6 Drawing Figures

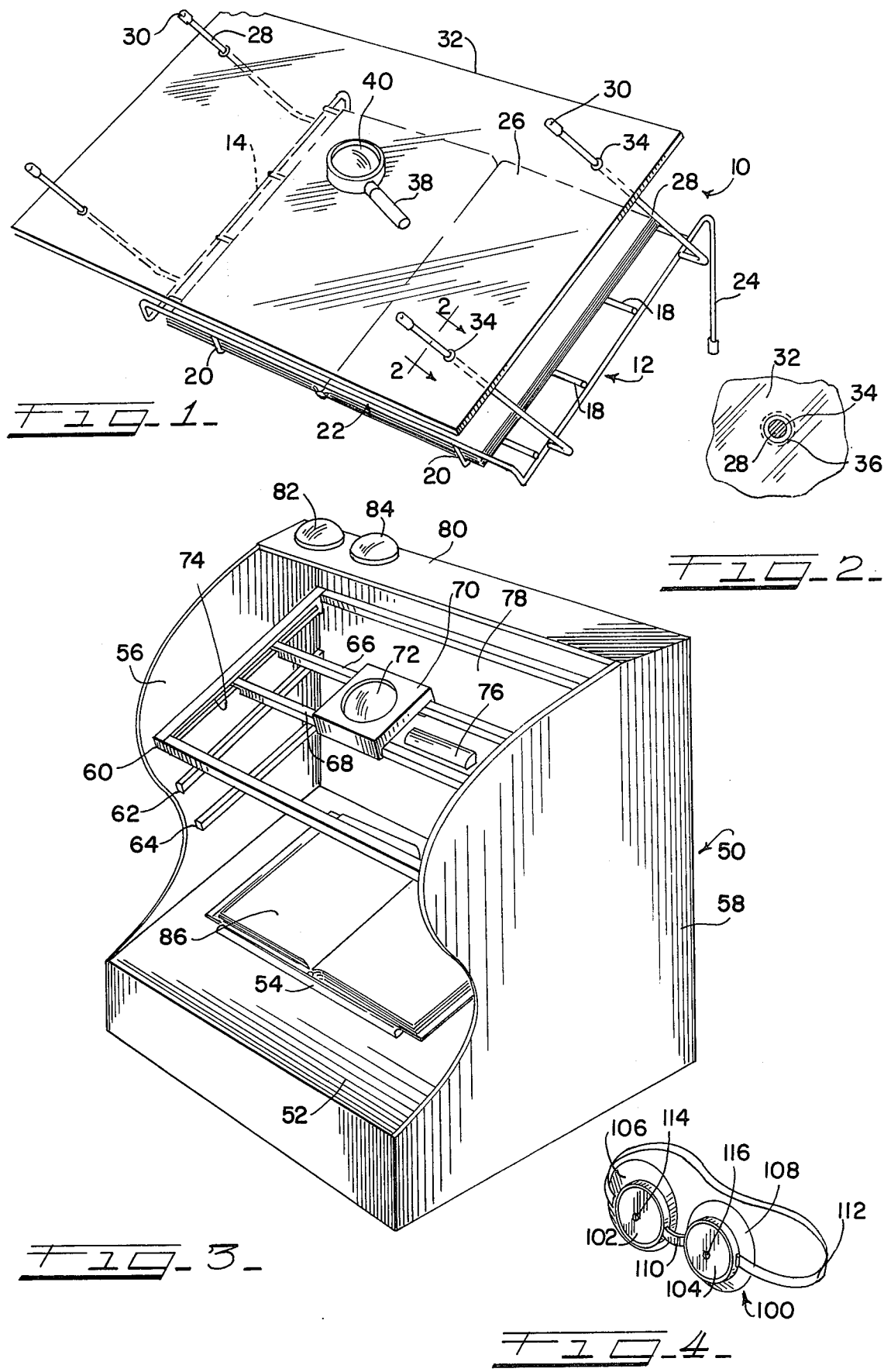

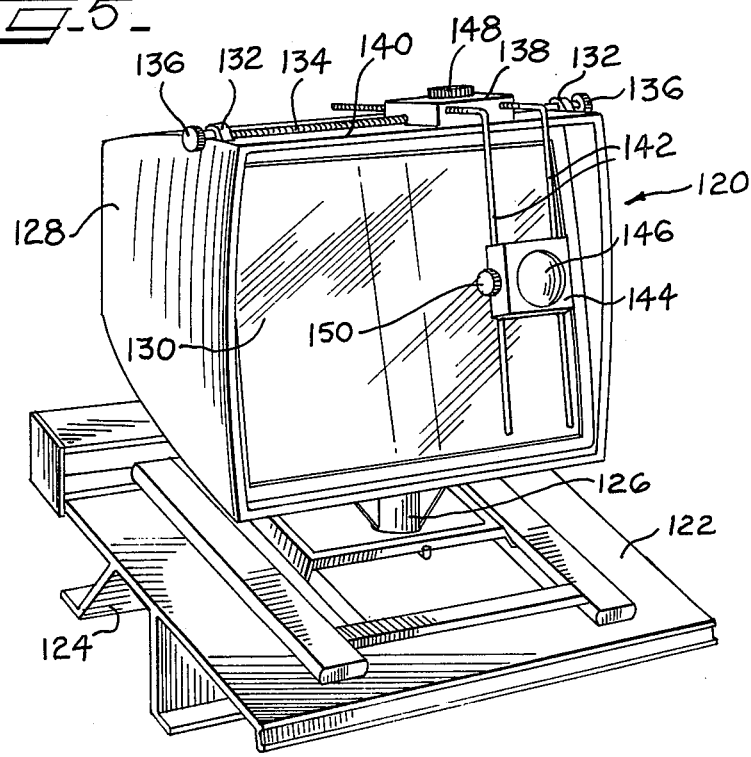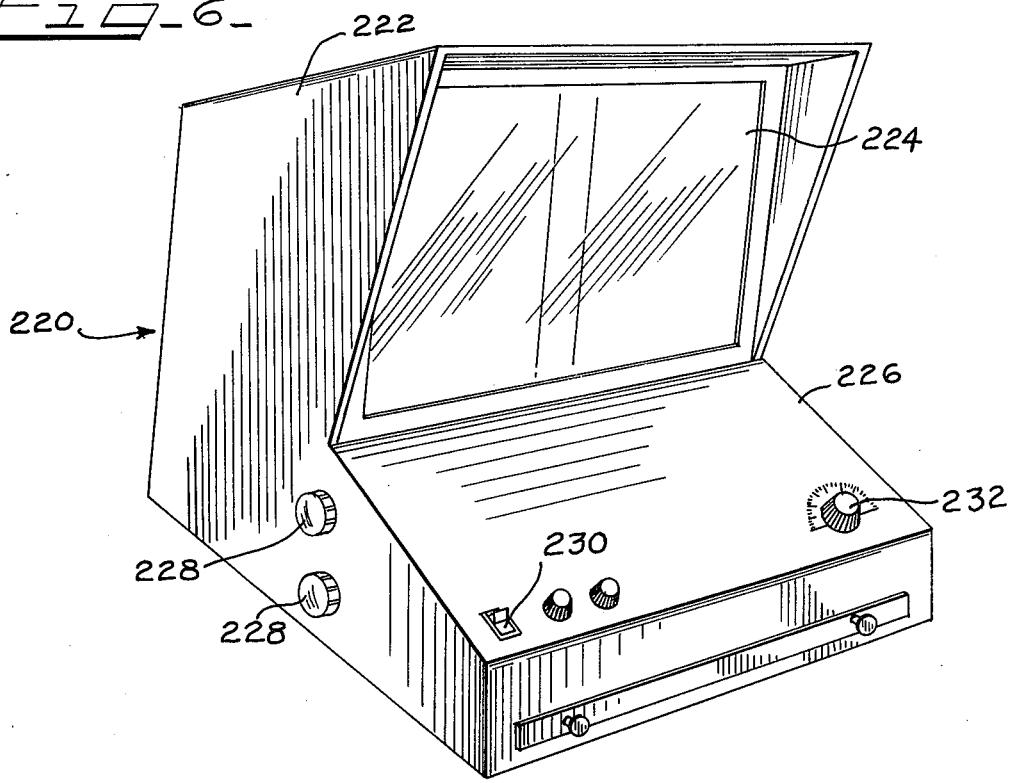

APPARATUS AND METHOD FOR TEACHING READING

REFERENCE TO RELATED APPLICATIONS

This application is a continuation-in-part of application Ser. No. 666,486, filed Mar. 12, 1976, now abandoned.

BACKGROUND OF THE INVENTION

The present invention relates to apparatus and methods adapted to improve reading skills, and particularly, to methods and apparatus which are useful in training children and other beginning or unskilled readers in acquiring and improving reading skills.

According to the invention, selected materials are used with a special apparatus in a predetermined, controlled sequence. The student is first acquainted with identified or control words which are then used in sentences, in stories, or in verse. The student is helped to identify individual syllables and words, and is forced to concentrate by increasing the accuracy of fixation, to work within a broader range or greater degree of flexibility, thus increasing his accommodation, and also to improve his visual motor function, or the ability of the eyes to move smoothly and rhythmically across a page containing printed words.

An excellent reader is one whose eyes combine and coordinate distinctly different functions, and who is able to perform such functions at maximum speed, with proper coordination between the functions.

For example, an ideal reader is one whose eyes rapidly and accurately fix upon the print so that the material to be absorbed, and only this material (to the exclusion of other material) is seen by the eyes and accurately fixed in the mind. Thus, the eyes of such a reader will perceive everything within a desired span or area with great accuracy in the minimum amount of time.

In such a person, the eyes accommodate themselves, either instinctively or by training, to different spans or scopes of material to be read, and the mind recognizes the meaning of the words or word groups perceived. Still further, after each fixation, during which the eyes accommodate themselves to the material to be viewed, the visual motor function comes into play such that the eyes, working together, move rapidly on to the next set of words to be read, again fix themselves accurately thereon, and so on.

It has been frequently demonstrated, and is acknowledged to be true, that words or groups of words can be perceived by a properly trained reader in as little as 1/100th of a second or less; that is, even when a word or group of words is flashed on a screen by a tachistoscope, the image thereof will remain in the eye of the reader for a sufficient time to be understood. After accommodating themselves to the group of words to be read, the eyes then move from left to right, to encounter the next set of words to be read, and this process continues to the end of the line, whereupon the eyes again move as a pair to the left margin of the printed material and repeat a series of fixating, accommodating, and motor movements as described above.

From the foregoing, it will be appreciated that, for proper speed and comprehension, the eyes must first fix upon any printed word or group of words for such time as is required to achieve recognition thereof. If the eyes do not fix upon the words (or in the case of beginning readers, the letters) with sufficient accuracy, errors in understanding may occur, or the pupil may simply be unable to read. Each act of fixation requires not only detecting and focusing in upon a word or group of words, but also implicitly requires that the correct word or group of words be selected for viewing from among the surrounding reading material.

Next, the eye must move to the next selected word or group of words and repeat the same process. In skilled readers, the processes are performed virtually simultaneously, that is, recognition takes place within a small fraction of a second, the ability to keep the eye in focus on the material is virtually instinctive and the movement is a regular, rapid, rhythmic movement determined largely by habit.

Implicitly, there are variations in performance among skilled readers inasmuch as the words may be of different lengths and degrees of difficulty. Basically, however, the reading speed adjusts automatically to the ease with which the material can be comprehended. With proper training, the eye moves always to the adjacent word or, in the case of good readers, to the adjacent group of words, all without either retreating for a second look or viewing overlapping portions of adjacent words or word groups.

With beginning readers, the same considerations are present insofar as such a beginner may be able only to view, focus on, and comprehend a single letter or syllable at one time. However, with training and experience the eye span is broadened to the point where a separate movement and subsequent fixation is not necessary for each letter, syllable or even each word, because the span of the eye is sufficient to take in as many as several words at one substantially instantaneous time. In such cases, eye movement is to the next group of words, and in the case of skilled readers, the eye automatically passes upon a word group beginning where the last word group stopped.

With increased practice and skill, the eye movements of a reader may be made such that the eyes move laterally along a series of words or groups of words until the end of a line of print is reached, whereupon the eyes move back again to the left margin of the line immediately below, and repeat the sequence. Accordingly, fixation upon one single center of a word or group of words should be definite and rapid, thus permitting the mind to begin absorbing the meaning of the word or word group immediately upon fixation, rather than directing a conscious effort to avoiding "hunting" or wandering of the eye.

It has been found, quite surprisingly, that the ability of some deficient beginning readers or children to fix with accuracy is enhanced by reducing the size of the print rather than enlarging the size thereof. Therefore, according to the present invention, individual words are looked upon by the reader through a series of lenses designed to provide minification of the material as opposed to magnification thereof. Another feature of the invention is presenting and reinforcing a rhythmic sense by providing auxillary indications of a regular rhythm which can be sensed by the reader. This may be accomplished by providing an auditory sensation, such as a metronome, or may be done by having the child manipulate his hands or feet in a rhythmic pattern. By way of example, squeezing and releasing a bean bag, tapping the foot, or the like, will accomplish this purpose.

The foregoing functions are most effectively used in conjunction with a selected reading program which includes an initial series of short words incorporating short vowels, and then moving to blends, including consonant blends. Next, the student moves on to words of more than one syllable. The initial words are simple, and the student works his way along into larger and more complex words having similar characteristics, with tests being administered periodically to determine whether the student has grasped the material previously studied.

The same procedure applies to the reading tempo or rhythm, insofar as the child or student begins reading at a pace which is slow and comfortable for him, with the pace being gradually accelerated so as to increase speed with which the eye may move and to decrease the time necessary for comprehension of each word or word group. It has been found that, by utilizing the principle of initial minification of the reading matter, accuracy of fixation is obtained, and the ability to fix rapidly and accurately in the desired viewing area is greatly increased. Use is made of the rhythmic sense, reinforced by external stimuli, to impart regular and rapid eye movement habits to the reader. The present system has been found especially helpful with problem readers, because it eliminates purely mechanical malfunctions of the visual system, and subsequently properly trains the reader in acquiring proper, and in any case, improved, visual motor function.

Bearing in mind the shortcomings of previous methods of teaching reading, it is an object of the present invention to provide an improved method for teaching reading to beginning and other students.

Another object is to provide a teaching method which includes using the principle of optical minification as an early step in teaching the reading process.

A still further object is to provide a method of teaching reading which includes permitting the student to view the reading material initially through a minification system of substantial power, followed by the viewing of reading material through lenses of gradually reduced minifying power.

Another object is to provide a method for teaching reading which includes imparting and reinforcing a rhythmic sense by the use of outside stimuli, and which further call for the learning reader to carry out rhythmic movements of one or more of his extremities at a tempo in keeping with that of the eye movements.

Another object is to provide a reading teaching method utilizing the foregoing principles, and further including program material beginning with simple, single syllable words and moving gradually into words of a greater difficulty.

A still further object is to provide a novel apparatus which is useful in teaching the novel reading method.

A still further object is to provide an apparatus for teaching reading which includes a portion for receiving the printed material to be read, and a portion adapted to support a lens for reducing the image size of the reading material received in the apparatus.

Another object is to provide a reading aid which includes means for receiving reading material, and means disposed thereabove for receiving a plurality of lenses of different dioptric power, with such lenses being adapted to reducing to varying extents the size of the image of the print seen by the reader.

The foregoing and other objects are achieved in practice by providing a method adapted to increase the accuracy of sight fixation, by presenting reduced size print images in the initial phase, to increase the accommodation of the eyes to different sizes of print and different widths of material, by training the eye to utilize an increased lateral span, and to impart and reinforce favorable visual motor function habits to the eyes.

The manner in which the foregoing and other objects and advantages of the invention are achieved in practice will become more clearly apparent when reference is made to the following detailed description of the preferred embodiments of the invention set forth by way of example and shown in part in the accompanying drawings, in which like reference numerals indicate corresponding parts throughout.

BRIEF DESCRIPTION OF THE DRAWINGS

FIG. 1 is a perspective view of one form of teaching apparatus useful in practicing the present invention;

FIG. 2 is an enlarged fragmentary plan view, showing a portion of the apparatus of FIG. 1;

FIG. 3 is a perspective view of a modified form of reading apparatus made according to the invention, and showing a lens holder adapted to receive a plurality of lenses of different optical powers;

FIG. 4 is a perspective view of specially constructed goggles useful for teaching reading in accordance with the invention;

FIG. 5 is a perspective view of a rear projection screen viewer which is modified according to the invention; and FIG. 6 is a perspective view of a rear projection screen viewer which is useful for practicing the method of the invention.

DESCRIPTION OF THE PREFERRED
EMBODIMENTS OF THE INVENTION

While it will be understood that various forms of apparatus may be used to provide the desirable features of print minification, a description will be made herein of two different forms of such apparatus which have been found simple and effective for purposes of receiving reading matter and supporting it for viewing through the optical systems referred to herein.

Referring now to drawings in greater detail, FIG. 1 shows a teaching apparatus generally designated 10 to include a generally planar, lower book-receiving portion 12 comprising left and right hand side bars 14, 16, laterally extending support rods 18, and upturned rear guide members 20 having their ends terminating at a generally horizontally extending crossbar 22. Downwardly extending front legs 24 provide a raised position for the front portion of the apparatus, causing the plane in which the rods and bars 14, 16, 18 are disposed to be inclined from front to rear, preferably at about a 30° angle.

Reading material in the form of a book 26 adapted to lie flat on the book-receiving portion 12 is disposed thereon. The apparatus 10 also includes a plurality of upwardly extending supports 28, preferably surmounted by soft tips 30. A flat transparent plate or sheet 32 lies above and parallel to the lower receiver 12. The support members 28 extend through openings 34 in the sheet 32, thereby locating the sheet vertically and horizontally with respect to the lower frame. FIG. 2 shows that the openings 34 in the sheet 32 include means in the form of a ring or grommet 36 which is sized for snug reception over the outside surfaces of the supports 28. This permits the sheet 32 to be positioned at whatever distances desired above the book 26, and to be maintained in such spaced apart relation by the friction resulting from engagement between the grommets 36 and supports 28.

FIG. 1 shows that a minifying glass 38 is supported on top of the sheet 32 for manipulation by the reader. According to the invention, the lens 40 in the glass 38 is a negative lens; that is, it reduces rather than enlarges the image size of the print disposed on the book 26 lying beneath the sheet 32.

Referring now to FIG. 3, another form of teaching apparatus generally designated 50 is shown to comprise a transversely extending, inclined between book support 52 having a book rest 54 thereon. The support 52 is positioned by contoured side walls 56, 58 supporting a plurality of holders 60, 62, 64 for transverse bars 66, 68.

A lens holder 70 having a lens 72 received centrally therein is mounted for transverse sliding movement across the bars 66, 68. Longitudinal movement of the bars 66, 68 and the lens holder 70 is provided for by grooves 74 cooperating with slots 75 in the holders 60, 62, 64. The modified teaching device 50 further includes a light 76 received on the back wall 78 of the device. A top wall or shelf 80 is shown to be provided for receiving additional lenses 82, 84, which may be interchanged with lens 72 when it is desired to change the optical power of the lens from time to time. The holders 62, 64 permit the bars 66, 68 and the lens support 70 to be positioned at their respective lower levels if this is indicated by the optical characteristics of the lenses 72, 82, 84, or by the size of the print on the book 86 which is received on the book support 52.

The holders 62, 64 are disposed parallel to the book support 52, with the latter being inclined somewhat with respect to the horizontal, for example, from 15 to 30 degrees.

Referring now to the practice of the invention, it will be assumed that a student is to be instructed by the method of the invention, and that he will be using the apparatus shown in FIG. 1. First, reading material of an ordinary type size and preferably in the form of a book 26 which will lay flat is placed on the book-receiving support 12.

This reading material preferably includes an array of simple, one syllable words subdivided into groups according to the single vowel lying between the initial and final consonants. For example, such a word group might consist of words such as "bat", "cat", "hat"; the next group might be "bet", "set", "get"; and still another group might be "bit", "hit", "fit", etc. Several groups, including the five ordinary vowels and the letter "y", are preferably used; in the last case, of course the vowel is found at the end rather than in the middle of the material.

The student then stands before the teaching device 10, and views the arrays of words on the printed page, beginning with a minification lens of the desired type. Preferably, such a lens has a 12 inch focal length, and can permit the viewer to focus upon the printed material when the lens is at a distance of from about 4 to about 20 inches. Such a lens might have a negative power of 15 diopters, for example. The minifying glass 38 is initially positioned so as to permit the child to view the initial words and groups in the upper left hand corner of the display in the book 26. The child reads the words aloud, and his eyes move in an orderly sequence from left to right, then down, left to right, then down, etc. It has been found that by making the word image very small, the eyes of the viewer are made to fix accurately on the individual words with both eyes, in this case being trained on a single word which is to be read. Because of the minification, the angular span of the eye is initially very small, but accuracy of fixation is very great because of the narrow angle subtended by the reduced size word.

After the viewer has read the word sequences as described above, his attention may be directed to exemplary sentences utilizing the words displayed in the regular array form described above. The student or reader has thus been exposed to and should understand the individual words which appear in the sentences before the sentences are attempted.

The eye movements necessary to read the words from the word groups and from the sentences may then be synchronized with a rhythm which may be preset by the instructor, for example, the ticking of a metronome. The child is then given a tangible object such as a bean bag, tennis ball, squeeze grip, weight, or the like, and instructed to squeeze the bag or ball and perhaps tap his foot in rhythm with the metronome, and at the same time to move his eyes in the rhythm detected by his ear and reproduced by the muscles in one or more extremities.

It has been found that the rhythmic sense which is desired to be imparted to the muscles of the eye is very easily taught when other, larger muscles are moving in the same rhythm as that intended to govern eye movements.

After a number of groups of words and single sentences are taught according to the foregoing, the pupil is tested for understanding and retention of meaning. The test may be repeated, and notes taken of the words missed with the lens adaptation in the first trial, in the second trial, etc. If the number of words missed is zero or is small, the teacher recommends proceeding to the next set of exercises.

Preferably, the material studied also incorporates simple poetry in its fairly early stages, so as to reinforce the rhythmic sense intended to be imparted to the child, and to provide another source of rhythm, namely the inherent meter or cadence of the material being read.

After reading with the greatest degree of minification, the child is then permitted to view reading material with a lens of greater focal length and less negative dioptric power, that is, a lens having a lower degree of minification. Typically such a second lens would have a 16 inch focal length and a power of 5 or 10 diopters.

Subsequently, the student views the reading material through a lens having only a small degree of minification and a still greater focal length, for example, 20 inches. As the degree of minification decreases, the angular eye span increases, but the actual widths seen by the student, in terms of words, will not necessarily increase at this time. However, the muscle movement and associated mental process involved in a widened angular span will enable the student to read words of increasingly greater length and ultimately to read groups of words. In some cases 2, 3, 4, or more words may be seen by the student in a single fixation.

As will be appreciated, with a doubled span in a constant time of fixation, reading speed can be doubled. It is, of course, known and accepted that ultimately, readers having wider eye spans and able to move their eyes with rapid rhythm comprehend written material better because the sense of the material is more easily grasped. This is because the reader can perceive a thought expressed in a word group, rather than being forced to reconstruct the thought assimilated from individual words in his mind as the reading process progresses.

While conditions will vary among individual students it has been found that following the method of the invention for periods of about ½ hour at a time produces good results. As the student is able to accommodate the different print sizes seen by him through the lenses of different power, the metronome or other rhythmic device is accelerated in tempo, thus forcing the student to increase the speed of recognition of the words. This may be done at a gradually increasing rate until eye movements are too rapid and unconscious to benefit from further training.

Referring now to FIG. 3, the student may be trained with this form of device along the lines set forth above, except that the lens holder 70 permits the lens to be moved automatically or to be manipulated by the teacher. This is found helpful when the student is using his hands for squeezing a bag or ball. In this connection, it is preferred that the student be standing rather than sitting during this time, and accordingly, the teaching aids 10, 50 are intended for use by students in the standing position.

While the reasons for the success of the method of the invention are not known with certainty, it is believed that prior efforts to teach reading have not fully taken into account the difficulties some readers experience in attempting to fix upon a particular word and bring it into focus. It is believed possible that, according to prior practices, enlargement of the image of the word to be read actually made reading the word more difficult, because, while the individual letters in the word might be thus enlarged, the angle subtended by the enlarged word was so great that the eye would roam or wander about from letter to letter within the word, perhaps seeing only one or more letters, without actually seeing and grasping the entire word. Actually, attempting to read an enlarged word involves not only recognition of the letters in the word, but presumes that the eye will fix upon the letters forming the word in the necessary left-to-right sequence, and not merely detect the presence of the individual letters.

It is believed that, according to the invention, untrained eyes, such as those of a beginning or untrained reader respond best when forced to focus on an object lying only within a small included angle. After undergoing the muscular movements necessary to fix upon a small but definite object, and subsequently to move to a succession of small but definite, spaced apart points, the eyes become accustomed to the focusing or fixating, as well as to the motor movement necessary to develop proper reading ability.

Accordingly, the present method emphasizes the necessary eye muscle faculties, and trains the eyes in achieving the focusing and movements which form the prerequisite of proper reading. Once the eyes have learned proper fixation within a narrow angular span, which is initially easy, the eyes subsequently learn fixation throughout a gradually increasing span. When this is achieved, long words, and even groups of words may be easily read.

Perhaps the problems troubling beginning or unskilled readers may be understood by reference to the experience of a person who is looking at a small, pinpoint object at a great distance, as opposed to looking at a large, undefined group of objects. For example, when the eyes focus on a small moving object, such as a distant aircraft flying slightly above the horizon, the mind does not ordinarily take in or register details of the sky or landscape, especially if fixing intently on the airplane in an effort to determine its make, color, or identification number. On the other hand, when viewing a panoramic scene, such as a mass of city lights at night from a tall building, the viewer does not ordinarily observe differences in detail, and particularly, differences in individual lights, without focusing upon them to the virtual exclusion of the remainder of the lights which comprise the panorama.

This emphasizes that the eye is capable of mentally separating small, individual objects lying in a narrow angular range from a background of whatever type; the eye is also capable of observing a scene or panorama extending across a wide visual angle. However, in visualizing the panorama, the eye does not observe with equal clarity all the detail which it would observe if the viewer were concentrating on a single object or smaller group of objects lying within a narrow angular span.

Similarly, it is thought that in learning to read, it is necessary first to be able to identify letters, then a sequence of letters, and finally a sequence of words. A skilled reader observes and understands a word or group of words and can read rapidly because he does not have to use the time necessary to focus on each individual letter within the word. However, before he attains this skill level, it is necessary for the reader to make certain that he observes sufficient detail so that he is reading the letters accurately and correctly. This enables him to acquire this basic skill first, and then to move on to the skill of observing accurately a letter group or word, and then finally repeating the eye movement sequence used in reading the individual letters by reading a series of words, horizontally from left to right in one line, and so on for a series of successive lines.

The method of the invention may therefore be thought of somewhat abstractly as training the eye to undergo a predetermined movement sequence consisting of both horizontal and vertical movement phases, and at the same time training the eye to fix upon the printed material contained within a series of image areas which are spaced apart both horizontally and vertically. The images first presented to the reader are of reduced size in relation to their normal size, and thus lie within an angular lateral span which is reduced with respect to the lateral span through which the eye is ultimately capable of accurate fixation, identification and understanding. In this connection, it will be seen that the image areas are initially selected so as to contain small, simple words, and ultimately to contain larger or more complex words. Eventually, the initial areas are not artificially created, as by spacing, but are created subconsciously and by force of habit within the mind of the reader. It will be understood that an image area is normally a word, but it could consist of numbers or even a picture, if this were required for some purpose. The eye movements in question may be thought of as taking place in a series of sequences that is, a left-to-right sequence, followed by downward vertical movement occurring coincidentally with a return or right-to-left eye movement.

In order to make the method of the invention more effective, and to avoid lost time and misdirected effort, it is desirable to test the student frequently to determine his progress. When the student has indicated by testing that he has grasped mentally the major portion of the thought content of the words in question, the next method step is carried out that is, the exercise is repeated with less minification or a new set of words, or both. Initially, the ability to fix upon and understand the word may be checked by having the student read aloud, while written testing may be partially or completely substituted for reading aloud as the teaching method continues to be used.

Referring now to FIG. 4, a pair of goggles 100, especially adapted for use with the present invention, is shown to include right and left hand lenses 102 and 104 adapted to be located, as by eye cups 106, 108, in a predetermined position over the eyes of a student reader. A nose piece 110 connects the cups 106, 108 together, while a head strap 112 is provided for holding the goggles in place in a known manner.

According to the invention, the lenses 102, 104 of these goggles 100 are painted black or inked over so as to render them completely opaque. Thereafter, small pin holes 114, 116 are drilled therein so that the user may see out only through these small pin holes, which are preferably one millimeter or less in diameter.

According to the invention, these goggles are only used if the reader requires them. Therefore, it is first determined whether the reader is one having difficulty attaining the desired accuracy of fixation with either or both eyes. Assuming that a fixation problem is present with a beginning reader, the interpupilary distance of the reader is measured, the desired distance from the material to be read is determined, as is the distance from the pupil of the eye to the pin hole. By simple triangulation, the distance between pin holes is determined for the student in question. As a consequence of proper spacing between openings in the blacked-out lenses, the eyes of the reader will be directed so that the lines of sight from his two eyes will converge at a single spot on the surface containing the reading material. The special goggles or glasses thus cause correct fixation and eye movement coordination by directing the lines of sight to the material desired to be seen, while simultaneously blocking out distractions, including reading matter peripheral to that intended to be read. This results in desirable eye movement habits being imparted to the beginning reader; i.e., his visual motor function is corrected and/or improved.

It will be understood that the use of the goggles is not a necessary feature of the invention in all cases, but that such specially made goggles may be necessary with students whose potential reading abilities are limited by their inability to focus on the areas desired for proper reading. Once fixation is achieved which is sufficiently accurate to enable the student to move consistently between adjacent words within a group with a rhythmic motion, the need for using the goggles may disappear, or at any rate, it will be reduced considerably. Ultimately, the goggles, like the minifying lenses, become unnecessary, because the reader has acquired visual motor function capability consistent with accurate, rapid reading.

In the foregoing description, occasional reference has been made, by way of comparison, to practices sometimes used in so-called "speed reading". However, it will be understood that the present invention is not directed to or concerned with speed reading. This is true even though an understanding of the present invention may be aided by referring to accepted speed reading concepts. The present invention is concerned instead with acquisition of much more fundamental skills, namely, accuracy of fixation, and training the visual motor function to operate according to the necessary criteria of accuracy and rhythmic movement.

Referring now to the relation between rhythmic movements of the body and parts thereof generally, and the relation of these movements to rhythmic eye movements necessary for good reading habits, the importance of this rhythm or so-called timed cadencing will be discussed. For present purposes, motor coordination in a subject may be considered the ability of a subject to undergo a total or intact response to a particular physical stimulus; for example, catching a ball rebounding from being dropped on the floor involves coordination of numerous muscles by the subject following the stimulus of hearing and seeing the ball bounce upward.

Smaller or younger children develop motor coordination by attempting movements in response to detection of a certain beat or cadence. For example, marching in time with music or clapping hands to music are examples of coordinating complex movements so that they occur in response or in apparent response to rhythmic stimuli. Squeezing the hands, a hand grip, or other object, and throwing a ball or stick from hand to hand to rhythm is good initial training to develop motor coordination. According to the invention, once the movements have been mastered, the frequency of the beat should be changed, and the student should be permitted or required to adapt his movements or movement sequences to the new rhythm. With a series of rubber balls, the trainee can throw a smaller ball back and forth, and then successively progress to larger size rubber balls, altering the beat or rhythm from time to time in each case.

Other exercises which improve motor coordination include more complex movement sequences such as pushing a ball back and forth, or tossing it back and forth to a beat. The students should, if possible, talk to each other during such an exercise so as to develop the ability to coordinate some movements with a rhythmic beat while also developing the ability to perform other operations at a normal or different rate, independently of the beat. Walking in place, leg scissor exercises and squeezing spring loaded hand grips, for example, help develop coordination and a sense of cadencing which is useful in learning to read. Pulling on springs, jump ropes, and other exercises which can be repeated rhythmically are also very helpful in developing motor coordination, which is essential to learning to read effectively.

More complex exercise can be attempted after the simpler exercise has been mastered and can be repeated at different rates as determined by an external rhythmic source. Various ball bouncing and throwing exercise to different rhythms are very helpful in developing such coordination. With many pupils, it is important to master the rhythmic exercises before attempting to begin reading. In any case, it is preferred that the teacher determine that the student possess the motor coordination necessary to read before reading exercises are attempted. Assuming, however, that the student has mastered basic motor coordination exercises, he is ready to begin reading exercises, which will also be performed while executing rhythmic movements of any of the types referred to herein.

Referring now to a typical exercise which has proved successful with certain individual students, printed material of the type referred to above is used. One form of such material is contained in a book entitled *Developmental Reading Program — Multilever* published by Conken Educational Systems of Mount Prospect, Ill., Copyright 1975 and written by the inventors hereof. Other suitable material may also be used.

Using the apparatus of FIG. 3, with a 12 diopter lens 72 received in the holder 70, the lens is positioned at the most distant level, that is, with the holders 60 supporting the cross bars 66, 68. The book 86 referred to above is held on the support 52.

The metronome referred to previously is then started at a slow rate and the words are read through the minifying glass in rhythm with the metronome, while, at the same time, the student taps his foot and squeezes one or two squeeze grips of the type used for hand exercises. The material is read for the length of time during which the student can maintain his concentration, for example, 10 to 30 minutes. During this time, or during such number of subsequent reading attempts as are required to have read from about six to about 20 pages in the book, the student continues to view the material through the 12 diopter lens. Such reading would include review of perhaps 500 to 2000 words.

After tests reveal that there has been substantial reading achievement at this level, the following six to 20 pages are attempted, again using plural rhythmic reinforcing means, such as the metronome and squeeze grip. This reading, which might comprise 500 to 3000 words, by way of example, is read through an 8 diopter lens received in the holder 70 and positioned closer to the reading material 86. By way of example, the bars 66, 68 would be received at the intermediate level by the holders 62. This provides an appropriate focal length for the 8 diopter lens.

After the student has mastered reading words which, as pointed out above, are longer and hence lie within an increased angular lateral span, another group of perhaps six to 20 pages is attempted. Again, the same rhythmic stimuli are used, and in this case the lens is a 4 diopter lens received in the holder 70 and positioned, as by supports 64 still closer to the material 86 to be read. In the foregoing examples, it will be understood that the optical powers referred to herein are negative powers, that is, the lenses are reducing rather than enlarging lenses.

During the foregoing exercises, it is also desired to gradually increase the rate of the rhythmic stimuli so as to enable the reader to increase his reading rate to an increased speed, although not to a speed which is of a rate considered "speed reading".

Before reading, and inbetween reading exercises per se, rhythm exercises of the type referred to herein may be carried out to assist the student in developing the visual motor function required for good reading.

After the reducing or minifying lenses have been used in the sequence referred to above, the remainder of the training takes place using reading material seen without change of image size.

The matter selected comprises words of gradually increasing length. The means for rhythmically stimulating the reader are kept in use even after the minifying lenses are no longer used.

In the above description, it has been assumed that an apparatus of the type shown in FIG. 1 or FIG. 3 has been used. However, it is also possible to obtain the advantages of the invention and to practice the method thereof by using a somewhat modified form of apparatus, such as the forms shown in FIGS. 5 or 6.

In these forms of apparatus, the principles of the method are the same and the function of the apparatus is also substantially the same; however, the methods and apparatus differ insofar as the material originates as a transparency or as matter which may be projected on a screen such as on a rear projection screen or the like. Inasmuch as the material is first displayed at a given size, which is small in relation to the type of print usually shown to a beginning reader. After the student has demonstrated his ability to read and perform the eye movements of the type referred to above, the reading matter type size is optically enlarged. After the reader has demonstrated his ability to accommodate the increased angular lateral span which characterizes the intermediate type size material, still further enlargement may take place. Depending on the type of optical viewer, infinitesimal adjustments of type size may be made, between limits, merely by adjusting the machine. Using these forms of apparatus, it is not literally necessary to begin the method by reducing the size of the type in question. It is only necessary to start with a small size and move to a larger size, however this is accomplished.

Referring now to FIG. 5, there is shown a rear projection screen type viewer generally designated 120 and shown to include a base plate 122 supported by legs 124. A stand 126 supports a main cabinet or housing 128 which includes a translucent screen 130 forming the face thereof. The viewer or projector 120 is of a known type in which material fed thereto, as by slides, microfiche, cassettes, or the like, is enlarged and displayed on rear projection screen 130.

Such a viewer or projector 120 is adapted for use to the present invention by the provision of a pair of ears 132 which locate a transversely extending rotatable threaded rod 134 actuated by knobs 136. The rod 134 extends transversely of the projector 120 and through a movable support housing 138 disposed adjacent the top surface 140 of the cabinet 128. A pair of support racks 142 extend forwardly and downwardly from the housing 138 and secure a holder 144 for a lens 146. Pinion-type adjusting knobs 148, 150, respectively, permit the racks 142 to be moved with respect to the housing 138, and permit the lens holder 144 to be moved with respect to the racks 142. Transverse movement of the housing 138 is accomplished by rotating the knobs 136, and vertical movement of the viewing lens 146 is achieved by rotating the knob 150. Preferably, the knob 150 is the pinion portion of a rack and pinion assembly (not shown in detail) of which the racks 142 form the other part. This construction facilitates vertical movement of the holder 144, and enables the student to view the entire surface of the screen during reading exercises.

In a machine of the type shown in FIG. 5, it will be assumed that the size of the image, that is, the degree of enlargement thereof, cannot be changed readily by projector adjustment alone. Consequently, lenses 146 of different powers are used for this purpose. In the case of a projector such as that shown in FIG. 5, it is possible to start with small size type initially, and therefore, the lenses may be enlarging, magnifying, or positive power lenses, in contrast to the minifying or negative power lenses described above and shown associated with the apparatus of FIGS. 1 and 3, for example. If the type is displayed in an enlarged size by the viewer or projector 120, however, the lenses may then be of the negative power or reducing or minifying type.

Referring now to FIG. 6, a rear projection screen type viewer generally designated 220 is shown to include a cabinet 222, a rear projection viewing screen 224, a control panel 226 and a plurality of controls including positioning and focusing knobs 228, an on-off switch 230, and an enlargement control 232. This type of viewer or projector is well-known to those skilled in the art and may be of any suitable type which permits the image displayed on the screen to be varied in size by a direct or remote control; in other words, it is a combination enlarger and projector.

In using a device of the sort shown in FIG. 6, the initial presentation of material to be read in a very small size can be achieved by manipulating the enlarger control 232 to a desired initial setting. After the student has achieved the eye movement pattern desired and has demonstrated an ability to grasp and retain the subject matter, the instructor can enlarge the images to the desired extent by manipulating the control 232. The process of establishing proper eye movement sequences in the reader and checking comprehension are then repeated before additional magnification takes place.

Apparatus of the type shown in FIGS. 5 and 6 will thus be seen to be useful for practicing the method of the invention. While viewers of this sort are highly effective, they are more expensive than the type of viewer shown in FIGS. 1 and 3, for example, and may thus be more suited to institutional or continuous-duty use than are the occasional-duty types of apparatus illustrated in FIGS. 1 to 3. The goggles described above and shown in FIG. 4 may also be used with the apparatus of FIGS. 5 and 6. The process of reading instruction using these viewers should also include the steps of stressing the body extremity muscles periodically in rhythm with the eye movements, preferably in rhythm with a metronome or the like.

From the foregoing, it will be seen that the invention generally comprehends the use of means adapted to insure that initial reading consists of accurate fixation within a narrow angle lateral span, assisted by the use of the goggles or other pin hole device as well as by the use of image reducing lenses, with these techniques being coupled with the use of an external source of rhythmic, sensible sensations, enabling the reader to develop the fixation and eye movement ability necessary for proper reading.

It will thus be seen that the present invention provides a novel method and apparatus for teaching reading, and that this method and apparatus have a number of desirable advantages and characteristics, including those pointed out herein and others which are inherent in the invention.

Preferred embodiments of the invention having been described by way of example, I anticipate that certain variations and modifications may be made in the practice of this method and the use of the apparatus without departing from the spirit of the invention or the scope of the appended claims.

I claim:

1. A method of teaching reading, said method comprising arranging a plurality of image areas containing selected reading material into a series of vertically spaced apart, horizontally extending lines, each containing a plurality of said image areas in horizontally spaced apart relation within said line, with said reading material lying within said image areas being displayed in a predetermined first type size, optically changing the apparent type size of said material within said areas to a substantially reduced size in relation to said first size, presenting said reduced size material to the reader and directing the eyes of the reader to focus and fix upon said matter in said image area, and subsequently along a succession of such image areas in a predetermined sequence of eye movement along said lines, directing the eyes of the reader to repeat said sequence of eye movement across a succession of similar lines lying respectively below the line just read, determining that the reader has fixed upon and understood the contents of the major portion of said image areas, and thereafter presenting the content of said image areas to the eyes of the reader without optical reduction in said predetermined, first type size, whereby the content of said image areas appears initially to lie within an area of reduced angular lateral span, and subsequently appears to lie within an image area of increased angular lateral span.

2. A method as defined in claim 1 which further includes optically changing said apparent type size of said material to another reduced size intermediate said first size and said reduced size, and directing the eyes of the reader through said eye movement sequence while reading said material of said intermediate size after so directing said eyes toward said reduced size material and before so directing said eyes to said predetermined first size.

3. A method as defined in claim 1 wherein determining that said reader has fixed upon and understood said contents comprises comparing the written contents of said image areas with words read aloud by said reader.

4. A method as defined in claim 1 wherein said determination that said reader has fixed upon and understood said contents comprises periodic administration of written test material to said reader.

5. A method as defined in claim 1 in which said image areas comprise simple written words for viewing by said reader at respectively said reduced size and said first predetermined size.

6. A method as defined in claim 1 which further includes instructing said reader to stress the muscles in at least one bodily extremity in coordination with said eye movements undertaken by said reader.

7. A method as defined in claim 6 wherein said stress is generated by applying a periodic squeezing motion to a distortable object received within the hand of said reader.

8. A method as defined in claim 1 which further includes providing an external source of rhythmically repeated, sensible sensations, and instructing the reader to coordinate the timing of his eye movements with the tempo of said rhythmic sensations.

9. A method as defined in clam 8 wherein said source comprises a metronome adapted to emit an audible signal.

10. A method as defined in claim 8 wherein said source comprises a metronome adapted to emit a visible signal.

11. A method as defined in claim 1 which further includes the step of directing the eyes of said reader to fix upon said matter in said image area by disposing an optical mask between said matter and the eye of said reader, said mask having two small apertures constructed and arranged so as to direct the slight lines of said reader to an area lying within a narrow angular lateral span.

12. A method as defined in claim 11 wherein said optical mask is in the form of a pair of goggles having opaque viewing areas with pin hole apertures therein, said apertures being spaced apart by a distance less than the interpupilary distance of said reader's eyes.

13. An apparatus for use in teaching reading, said apparatus including generally planar means lying on a first level and adapted to receive reading material for display thereof in generally upwardly facing relation, optical means for reducing the apparent image sizes of at least portions of said reading material, means for supporting said optical means, means for spacing said supporting means apart from said receiving means and for positioning said supporting means in generally parallel relation to said receiving means, and adjustment means for permitting said supporting means to be moved between a plurality of positions to enable said optical image reducing means to be focused upon said reading material disposed on said receiving means.

14. An apparatus as defined in claim 13 wherein said supporting means comprises a generally flat sheet of transparent material, whereby said optical means may be supported thereon and moved about the surface of said generally flat sheet for viewing said material at a reduced size, and whereby said reading material is able to be viewed through said sheet to facilitate positioning of said optical means.

15. An apparatus as defined in claim 14 wherein said adjustment means comprises elastomeric retainers adapted to cooperate with said spacing means for holding said receiving and supporting means in a desired position.

16. An apparatus as defined in claim 13 in which said supporting means comprises a lens holding apparatus mounted for movement both laterally and longitudinally of said reading material.

17. A method of teaching reading, said method comprising arranging a plurality of image areas containing selected reading material into a series of vertically spaced apart, horizontally extending lines, each containing a plurality of said image areas in horizontally spaced apart relation within said line, with said reading material lying within said image areas being displayed in a predetermined first type size much smaller than that sized normally for reading by adults from a normal distance, presenting said material to the reader and directing the eyes of the reader to focus and fix upon said matter in said image area, and subsequently along a succession of such image areas in a predetermined sequence of eye movement along said lines, directing the eyes of the reader to repeat said sequence of eye movement across a succession of similar lines lying respectively below the line just read, determining that the reader has fixed upon and understood the contents of the major portion of said image areas, thereafter optically changing the apparent type size of said material within said areas to a substantially enlarged size in relation to said first size, and presenting the content of said image areas to the eyes of the reader in said enlarged size, whereby the content of said image areas appears initially to lie within an area of reduced lateral span, and subsequently appears to lie within an image area of increased angular lateral span.

18. A method as defined in claim 17 which further includes optically changing said apparent type size of said material to another size intermediate said first size and said enlarged size, said intermediate type size being a size which is substantially reduced in relation to type which is sized for normal reading at a normal reading distance, and directing the eyes of the reader through said eye movement sequence while reading said material of said intermediate size after so directing said eyes toward said first size material and before so directing said eyes to said enlarged size material.

19. A method as defined in claim 17 which further includes the step of directing the eyes of said reader to fix upon said matter in said image area by disposing an optical mask between said matter and the eye of said reader, said mask having two small apertures constructed and arranged so as to direct the sight lines of said reader to an area lying within a narrow angular lateral span.

20. A method as defined in claim 19 wherein said optical mask is in the form of a pair of goggles having opague viewing areas with pin hole apertures therein, said apertures being spaced apart by a distance less than the interpupilary distance of said reader's eyes.

* * * * *